UNITED STATES PATENT OFFICE.

JOHANNES MOHLER AND CARL ALEXIS MAYER, OF BASLE, SWITZERLAND, ASSIGNORS TO L. DURAND, HUGUENIN & CO., OF SAME PLACE.

BLUE DYE.

SPECIFICATION forming part of Letters Patent No. 444,538, dated January 13, 1891.

Application filed August 20, 1890. Serial No. 362,535. (No specimens.)

*To all whom it may concern:*

Be it known that we, JOHANNES MOHLER and CARL ALEXIS MAYER, both citizens of Switzerland, and residents of Basle, Switzerland, have jointly invented certain new and useful Products for Use in the Arts of Dyeing and Printing, of which the following is a specification.

This invention relates to the production of new blue coloring-matters derived from those products which result from the action of the nitroso derivatives of the tertiary aromatic amines on the condensation products of tannin with aniline and its homologues, as set forth in the United States Patent No. 420,164, dated January 28, 1890, and the application of Mayer, Serial No. 326,836, filed October 12, 1889.

These new products are obtained as follows: The coloring-matters described in the Letters Patent and pending application above mentioned—that is to say, the coloring-matters obtained by the action of nitroso derivatives of tertiary aromatic amines in the condensation products of tannin with aniline and its homologues are treated with aniline or one of its homologues, such as ortho-toluidine, paratoluidine, the xylidines, the naphthylamines, or by the para or meta phenylenediamines, or by a mixture of two or more of these amines, at a temperature of from 212° to 392° Fahrenheit. The marks of distinction of the new products thus produced from the coloring-matters described in the said Letters Patent and application consist in their crystallizing properties and the color of their solutions when they are dissolved in concentrated sulphuric acid. The coloring-matters described in said patent and application when dissolved in concentrated sulphuric acid yield solutions having a bright-blue color, while the new product obtained as above described yields a solution when dissolved in the same medium having a cherry-red color.

By treating these new products with sulphuric acid they yield sulpho-acids, which are new blue coloring-matters, and these are obtained with monohydrated sulphuric acid at a temperature of from 176° to 212° Fahrenheit, or when the sulphuric acid used contains sulphuric anhydride in various proportions they may be obtained at the ordinary temperatures, or even temperatures lower than the ordinary. The alkaline salts of these sulpho-acids are all very soluble in water, and in order to isolate the coloring-matter and separate it from the excess of sulphuric acid a lime treatment similar to that for the superior sulpho-acids of the phenylated rosaniline must be used. These sulpho-acids and their alkaline salts will dye wool and silk in acidulated baths with blue shades, and with such mordants as iron, chrome, &c., they give deeper but duller shades of color.

We will now give an example of our mode of obtaining these new products described above; but we do not wish to limit ourselves to the proportions and temperatures we shall give in this particular case.

Example: One part of the blue die obtained according to the terms of the United States Patent No. 420,164 (by the action of the condensation products of tannin with aniline on hydrochlorate of nitroso-dimethylaniline) is mixed with two parts of pure aniline, and this mixture is heated in an oil bath for two hours at a temperature of 316° Fahrenheit. The mixture at first becomes very thick, but soon liquefies and becomes fluid. It is then cooled down and the new product crystallizes in flakes of a copper-colored luster, while the product from which this is derived crystallizes in small needles of a greenish color. The new product thus obtained is separated from the excess of aniline by washing it with alcohol.

This new product above described is an intermediate product, and in order to obtain from it the new blue coloring-matter we dissolve one part of the said intermediate product in four parts of monohydrated sulphuric acid by heating the mixture for several hours in a water bath. This solution is then mixed with a sufficient quantity of water and the whole neutralized with lime and filtered, and the filtrate is transformed into a soda or ammonia salt, which, after being separated from the carbonate of lime, is evaporated until nearly dry.

The new sulpho-acid thus obtained is scarcely soluble in water, while its dry alkaline salts have a coppery luster, are readily soluble in cold water and in alcohol, the solution having a greenish-blue color, are precipitated by dilute acids, and are soluble in concentrated sulphuric acid, the solution having a cherry-red color.

If in the operation of sulpho-copulation above described we substitute for the monohydrated acid strong fuming sulphuric acid containing, for example, twenty per cent. of sulphuric anhydride, the sulpho-acid obtained will form soluble salts with the alkalies; but when fuming acid is thus used in the copulation care must be taken that during the introduction of the substance or product above described the temperature shall remain at from 59° to 64° Fahrenheit. Otherwise if this higher temperature be exceeded the coloring-matter will be destroyed. The sulpho-copulation with fuming sulphuric acid may also be effected as follows: When the substance or product employed—namely, that obtained by the action of aniline on the blue dye obtained from the hydrochlorate of nitroso-dimethylaniline and the products of the condensation of tannin and aniline—has been added to fuming sulphuric acid at a temperature below 64° Fahrenheit, the mixture is stirred for about thirty minutes, the temperature being meanwhile maintained at from 59° to 64° Fahrenheit. Then it is slowly poured into a sufficient quantity of water and the mixture neutralized with an excess of lime. The blue dye is precipitated with sulphate of lime, as a lime lake, which is first pressed, and then again decomposed with dilute sulphuric acid. From this solution the blue dye is precipitated by means of a slight excess of ammoniacal liquor as the solution of an ammonia salt.

Having thus described our invention, we claim—

1. The herein-described method of transforming the products obtained by the action of the nitroso derivatives of the tertiary aromatic amines on the products of condensation of tannin with aniline and its homologues, which method consists in subjecting said products to the action of primary aromatic amines at a temperature of from 212° to 392° Fahrenheit until the mixture becomes fluid, and then, when the mass has cooled and crystallized, separating the crystals of the newly-formed products of condensation from the excess of primary aromatic amine employed, substantially as set forth.

2. The herein-described method of preparing blue coloring-matters, which consists in treating with sulphuric acid the new product obtained by subjecting to the action of primary aromatic amines at a temperature of from 212° to 392° Fahrenheit the blue dye obtained by the action of the nitroso derivatives of the tertiary aromatic amines on the condensation products of tannin with aniline and its homologues, substantially as set forth.

3. The new products of condensation resulting from the action of the primary aromatic amines on the products of dyes obtained by the action of the nitroso derivatives of the tertiary aromatic amines on the condensation products of tannin with aniline and its homologues, said new products crystallizing in plates having a copper-colored luster, being scarcely soluble in alcohol and soluble in concentrated sulphuric acid with a cherry-red color, as set forth.

4. The coloring-matters obtained by sulpho-conjugating the new products resulting from the action of the primary aromatic amines on the dyes obtained by the action of the nitroso derivatives of the tertiary aromatic amines on the condensation products of aniline and its homologues, said coloring-matters being scarcely soluble in water, soluble in concentrated sulphuric acid with a cherry-red color, and forming with the alkalies salts with a copper-colored luster readily soluble in water and alcohol with a greenish-blue color, soluble in concentrated sulphuric acid with a cherry-red color, and adapted to be employed for dyeing and printing, as set forth.

In witness whereof we have hereunto signed our names in the presence of two subscribing witnesses.

JOHANNES MOHLER.
CARL ALEXIS MAYER.

Witnesses:
PHILIPP GÜSS,
A. KAUFMANN.